(12) United States Patent
Morimoto et al.

(10) Patent No.: US 7,038,823 B2
(45) Date of Patent: May 2, 2006

(54) LIGHT SCANNING DEVICE

(75) Inventors: Yoshinori Morimoto, Kanagawa (JP);
Tadashi Masuda, Kanagawa (JP);
Tsuyoshi Tanabe, Kanagawa (JP);
Kiyoshi Kondou, Kanagawa (JP);
Kenichi Saito, Kanagawa (JP); Yoichi Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/190,921

(22) Filed: Jul. 28, 2005

(65) Prior Publication Data
US 2006/0023283 A1    Feb. 2, 2006

(30) Foreign Application Priority Data
Jul. 29, 2004  (JP) .............................. 2004-222081

(51) Int. Cl.
*G02B 26/08*   (2006.01)

(52) U.S. Cl. ...................... 359/205; 359/204; 359/206; 347/259

(58) Field of Classification Search ..................... None
See application file for complete search history.

(56) References Cited

U.S. PATENT DOCUMENTS
5,646,767 A    7/1997  Iima et al.

FOREIGN PATENT DOCUMENTS

| JP | 05-346553 A | 12/1993 |
|---|---|---|
| JP | 09-033842 A | 2/1997 |
| JP | 09-274134 A | 10/1997 |

*Primary Examiner*—James Phan
(74) *Attorney, Agent, or Firm*—Birch, Stewart, Kolasch & Birch, LLP

(57) ABSTRACT

A first fθ lens is arranged to form an inclination angle α1 to a main scanning plane. A second fθ lens is arranged to form an inclination angle α2. In order to determine the inclination angles α1 and α2, curvature amounts of scanning lines generated on a scanned surface are measured when the fθ lenses are independently inclined one at a time at a minute angle. Change rates K1 and K2 are obtained from the measured curvature amounts and the minute angles. The inclination angles α1 and α2 are determined such that |K1α1+K2α2| is no more than a certain value.

11 Claims, 11 Drawing Sheets

LIGHT SCANNING DEVICE

BACKGROUND OF THE INVENTION

1. Field of the Invention

The present invention relates to a light scanning device used in an image reader and an image recording apparatus.

2. Description of the Prior Arts

A photo-printer, a laser printer, and the like are provided with a light scanning device for converging a light beam emitted from a light source on a scanned surface as a light spot and scanning the light spot on the scanned surface. The light scanning device is provided with a polygon mirror for scanning the light beam, and scanning lenses for focusing the light beam. However, there is a problem that a printing trouble so-called "ghost" occurs on the scanned surface due to multiple reflections of a part of the light beam between the optical members.

Japanese Patent Laid-Open Publications No. 9-33842 and No. 5-346553 propose to remove reflection components by rotating the scanning lens in the main scanning direction, so that the ghost caused by the multiple reflections is prevented.

In addition, Japanese Patent Laid-Open Publication No. 9-274134 proposes to prevent the ghost caused by the reflection on the flat covering plate by tilting the flat covering plate, which constitutes a part of the housing for sealing the polygon mirror.

However, in Japanese Patent Laid-Open Publications No. 9-33842 and No. 5-346553, there is another problem that the scanning line is curved in a sub-scanning direction by tilting the scanning lens. This curvature of the scanning line, so-called "bowing" deteriorates the image quality. Although Japanese Patent Laid-Open Publication No. 9-274134 is provided with an extra flat plate for correcting the curvature of the scanning line caused by tilting the flat covering plate, the scanning device becomes complicated and the manufacturing cost is raised.

SUMMARY OF THE INVENTION

A primary object of the present invention is to provide a light scanning device capable of preventing ghost with a simple structure.

Another object of the present invention is to provide a light scanning device capable of keeping curvature of a scanning line generated in a sub-scanning direction to minimum.

In order to achieve the above and other objects, a light scanning device of the present invention includes a scanning lens group. The scanning lens group has (n) lens units (n is a natural number of $\geq 2$). The lens units are arranged so that optical axes thereof are inclined to a main scanning plane. The inclination angle of each lens unit should be determined to satisfy the following condition:

$|K1\alpha 1+K2\alpha 2+ \ldots +Kn\alpha n|\leq 0.2$ mm where $\alpha i$ is the inclination angle of an i-th lens unit (i is from 1 to n) from a deflector, and a change rate $Ki$ when only the i-th lens unit is inclined at a minute angle $Ai$ is defined as $Ki=\Delta i/Ai$ where a curvature amount on a scanned surface is represented as $\Delta i$.

In a preferred embodiment of the present invention, the light scanning device has at least one optical member for reflecting a light beam from the scanning lens group to the scanned surface. The inclination angle of each lens unit is determined such that the beam reflected plural times between the lens units does not enter the optical member. The inclination angle $\alpha 1$ of a first lens unit, which is the closest lens unit to the deflector, satisfies the following mathematical expression (5):

$$\begin{cases} \left| -r_0 + \frac{t_0}{2}\cos 2\alpha_1 - \xi_0 \sin 2\alpha_1 + 2\xi_1 \sin\alpha_1 \right| > \omega_0 \sqrt{1 + \left(\frac{4\lambda Q_a}{\pi \omega_0^2}\right)^2} \\ \text{However, } -\left(\frac{t_0}{2} - \omega_0\right) \leq r_0 \leq \frac{t_0}{2} - \omega_0 \\ Q_a = \xi_0 - \frac{\xi_1}{\cos\alpha_1} + r_0 \tan\alpha_1 + \frac{1}{2}\left|2\cos 2\alpha_1\left(\xi_0 - \frac{\xi_1}{\cos\alpha_1}\right) + t_0\sin 2\alpha_1 - 2r_0 \tan\alpha_1\right| \end{cases}$$

where $\lambda$ is a wave length of the longest light beam; $\omega 0$ is a beam waist diameter of the light beam having wave length $\lambda$ near a reflective surface of the deflector; $\xi 0$ is distance from a reflection point of the light beam on the reflective surface of the deflector to a flat surface perpendicular to a main scanning plane, and the flat surface includes a center axis of the first lens unit; $\xi 1$ is distance from the center axis of the first lens unit to the light entering surface of the first lens unit; $r0$ is distance from a flat surface parallel to the main scanning plane to the reflection point of the light beam on the reflective surface of the deflector, and the flat surface includes the center axis of the first lens unit; and $t0$ is width in a sub-scanning correspondence direction of the reflective surface of the deflector.

The inclination angle $\alpha 1$ satisfies the following mathematical expression (6):

$$\begin{cases} Q_B > \omega_0 \sqrt{1 + \left(\frac{4\lambda \tilde{R}_0 T}{\pi \omega_0^2}\right)^2} \\ \text{However, } -\left(\frac{t_0}{2} - \omega_0\right) \leq r_0 \leq \frac{t_0}{2} - \omega_0 \\ Q_B = \left| r_0 - \frac{1}{2}t_2 \cos 3\alpha_1 + 2\xi_0 \sin 2\alpha_1 - (2\sin\alpha_1 + \sin 3\alpha_1)\xi_1 \right| \\ \tilde{R}_0 T = Q_\gamma + Q_\delta \\ Q_\gamma = \left(1 + \frac{1}{\cos 2\alpha_1}\right)\left(\xi_0 - \frac{\xi_1}{\cos\alpha_1} + r_0 \tan\alpha_1\right) \\ Q_\delta = |\cos 2\alpha_1||\tan 2\alpha_1\{\frac{1}{\cos 2\alpha_1}(r_0 + \xi_0 \sin 2\alpha_1 - 2\xi_1 \sin\alpha_1)\} + \\ \{-(\xi_0 - \xi_1\cos\alpha_1 + \frac{t_2}{2}\sin\alpha_1) - \tan 2\alpha_1(\xi_1\sin\alpha_1 + \frac{t_2}{2}\cos\alpha_1)\}| \end{cases}$$

where $\lambda$, $\omega 0$, $\xi 0$, $\xi 1$, and $r0$ are similar to those in the mathematical expression (5). $t1$ and $t2$ are respectively width in the sub-scanning correspondence direction of the reflective surface of the deflector and width in the sub-scanning correspondence direction of the light entering surface of the first lens unit.

In a preferred embodiment of the present invention, the lens unit has a first f$\theta$ lens and a second f$\theta$ lens disposed one by one from the deflector.

According to the light scanning device of the present invention, both the ghost and the curvature of the scanning line in the sub-scanning direction can be kept to the minimum with a simple structure.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
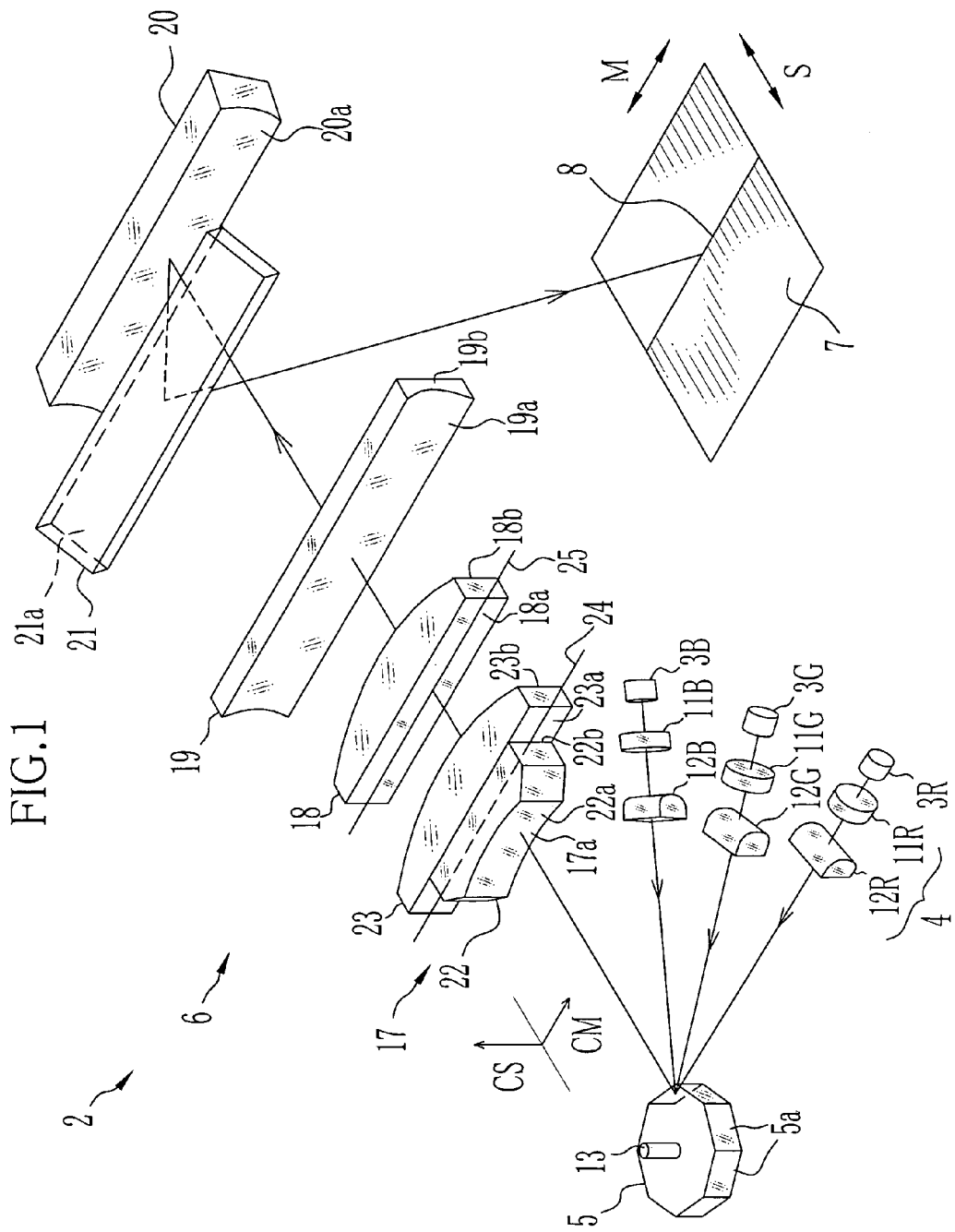
FIG. 1 is a schematic perspective view of a light scanning device of the present invention.

As shown in FIG. 1, a light scanning device 2 is constituted of light sources 3R, 3G, and 3B, a light source optical system 4, a polygon mirror 5, and a scanning optical system 6. Laser is used as the light sources 3R, 3G, and 3B. The light sources respectively emit red, green, and blue light beams modulated in accordance with image information. The light source optical system 4 irradiates each light beam from the light sources 3R, 3G, and 3B to the polygon mirror 5. The scanning optical system 6 converges each light beam modulated by the polygon mirror 5 on a photosensitive recording paper 7 set on a scanned surface as a light spot. One line of a color image is recorded on the recording paper 7 as a scanning line 8 by scanning the light spot in a main scanning direction M on the recording paper 7.

Hereinafter, a flat surface which is perpendicular to a rotation shaft 13 of the polygon mirror 5 and formed by deflection of the light beam is referred to as a main scanning plane. Meanwhile, a direction where the light beam is deflected by the polygon mirror 5 is referred to as a main scanning correspondence direction CM corresponding to the main scanning direction M of the recording paper 7. Moreover, a direction perpendicular to the main scanning correspondence direction CM is referred to as a sub-scanning correspondence direction CS corresponding to the sub-scanning direction S of the recording paper 7.

The light source optical system 4 is a multibeam optical system and constituted of collimator lenses 11R, 11G, and 11B and cylindrical lenses 12R, 12G, and 12B. The collimator lenses 11R, 11G, and 11B convert each light beam from the light sources 3R, 3G, and 3B into parallel light. The cylindrical lenses 12R, 12G, and 12B have power only in the sub-scanning correspondence direction CS, and converge the parallel light exited from each of the collimator lenses 11R, 11G, and 11B in the sub-scanning correspondence direction CS.

The polygon mirror 5 having a polygonal prism shape is a mirror each side surface of which is a reflective surface 5a, and rotates around the rotation shaft 13 at a constant speed. The light beam entered the reflective surface 5a is deflected by the polygon mirror 5, and then advances to the scanning optical system 6. The polygon mirror 5 is in an interlocked state when a cover (not shown) for the light scanning device 2 is opened, and then stops rotating. Meanwhile, although the polygon mirror 5 is in a standby state to rotate at low speed when the light beam is not emitted from the light source 3 with the cover closed, the polygon mirror 5 rotates at high speed when scanning the light beam from the light source 3.

The scanning optical system 6 is constituted of a first fθ lens 17, a second fθ lens 18, a cylindrical lens 19, a cylindrical mirror 20, and a flat mirror 21. The first fθ lens 17 and the second fθ lens 18 are lens units, which mean a single lens or a lens group in which plural lenses are integrated.

The first fθ lens 17 is constituted of a first lens 22 and a second lens 23. The first lens 22 has a concave cylindrical surface 22a in the light entering side and a flat surface 22b in the light exiting side. The concave cylindrical surface 22a has power only in the main scanning correspondence direction CM. The flat surface 22b does not have power in any direction. The second lens 23 has a flat surface 23a in the light entering side and a convex cylindrical surface 23b in the light exiting side. The convex cylindrical surface 23b has power only in the main scanning correspondence direction CM. The first and second lenses 22 and 23 are integrated with each other by sticking the flat surfaces 22b and 23a together. Note that the concave cylindrical surface 22a is a light entering surface 17a of the first fθ lens 17. The second fθ lens 18 has a flat surface 18a in the light entering side and a convex cylindrical surface 18b in the light exiting side. The convex cylindrical surface 18b has power only in the main scanning correspondence direction CM.

Figure 2:
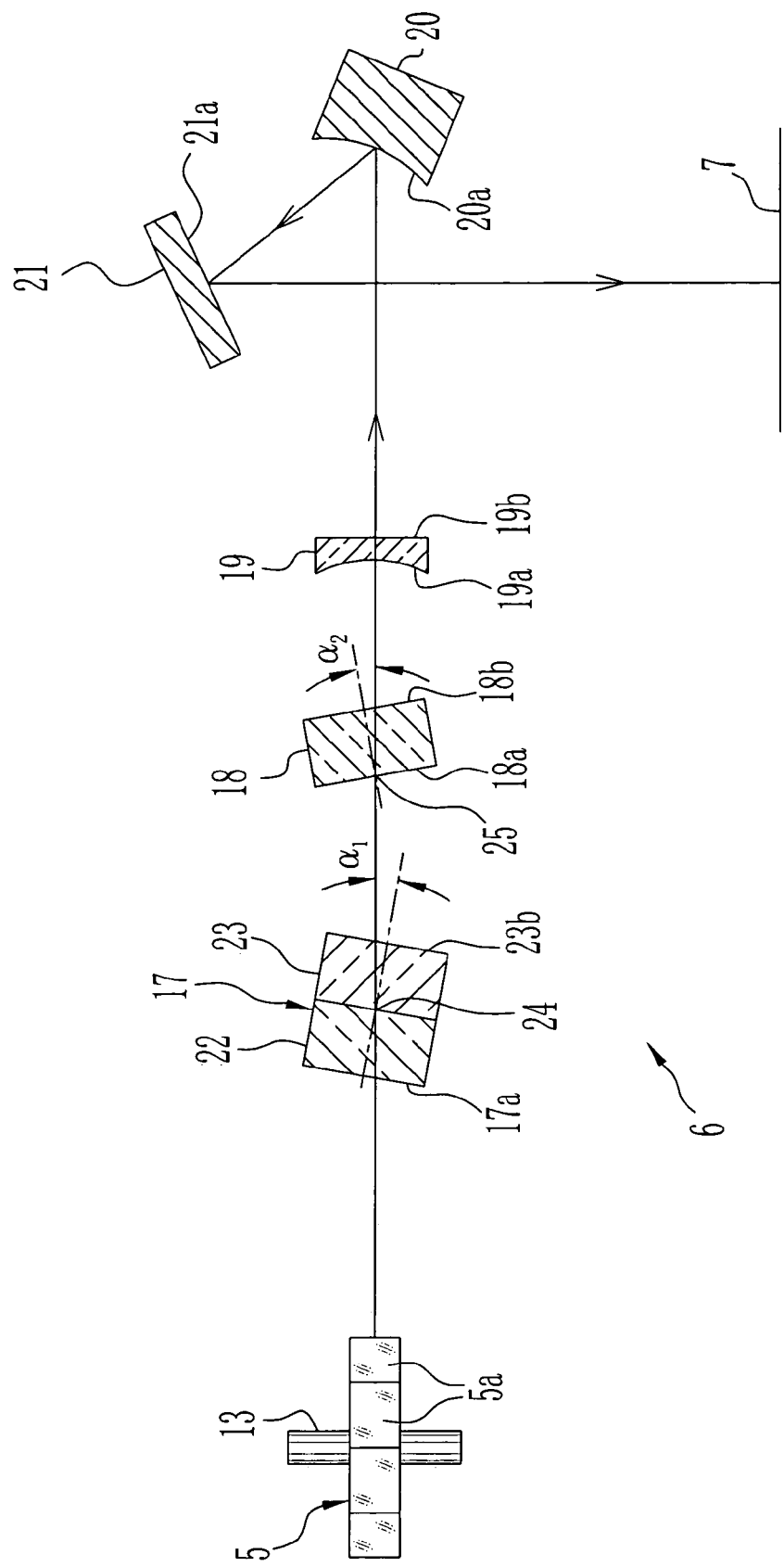
FIG. 2 is a side view of the light scanning device.

As shown in FIG. 2, the first fθ lens 17 is arranged to have an inclination angle α1 to the main scanning plane centering around a center axis line 24 extending in the main scanning correspondence direction CM. The second fθ lens 18 is arranged to have an inclination angle α2 to the main scanning plane centering around a center axis line 25 extending in the main scanning correspondence direction CM. The inclination angles α1 and α2 are determined by the after-mentioned conditions.

Aberrations of the first and second fθ lenses 17 and 18 are corrected such that the light beam deflected by the polygon mirror 5 is scanned on the recording paper 7 at a constant speed in the main scanning direction M.

The cylindrical lens 19 has a concave cylindrical surface 19a in the light entering side and a flat surface 19b in the light exiting side. The concave cylindrical surface 19a has power only in the sub-scanning correspondence direction CS. The cylindrical mirror 20 has a reflective surface 20a which is a concave cylindrical surface having power only in the sub-scanning correspondence direction CS. The light beam exited from the second fθ lens 18 is converged in the sub-scanning correspondence direction CS through the cylindrical lens 19 and the cylindrical mirror 20. If the verticality of the reflective surface 5a is varied, the deflection in the sub-scanning correspondence direction CS of the light beam can be corrected. Thereby, the plane tilt of the polygon mirror 5 is corrected so that the irregularity in a line space between the scanning lines 8 on the recording paper 7 can be prevented.

Figure 3:
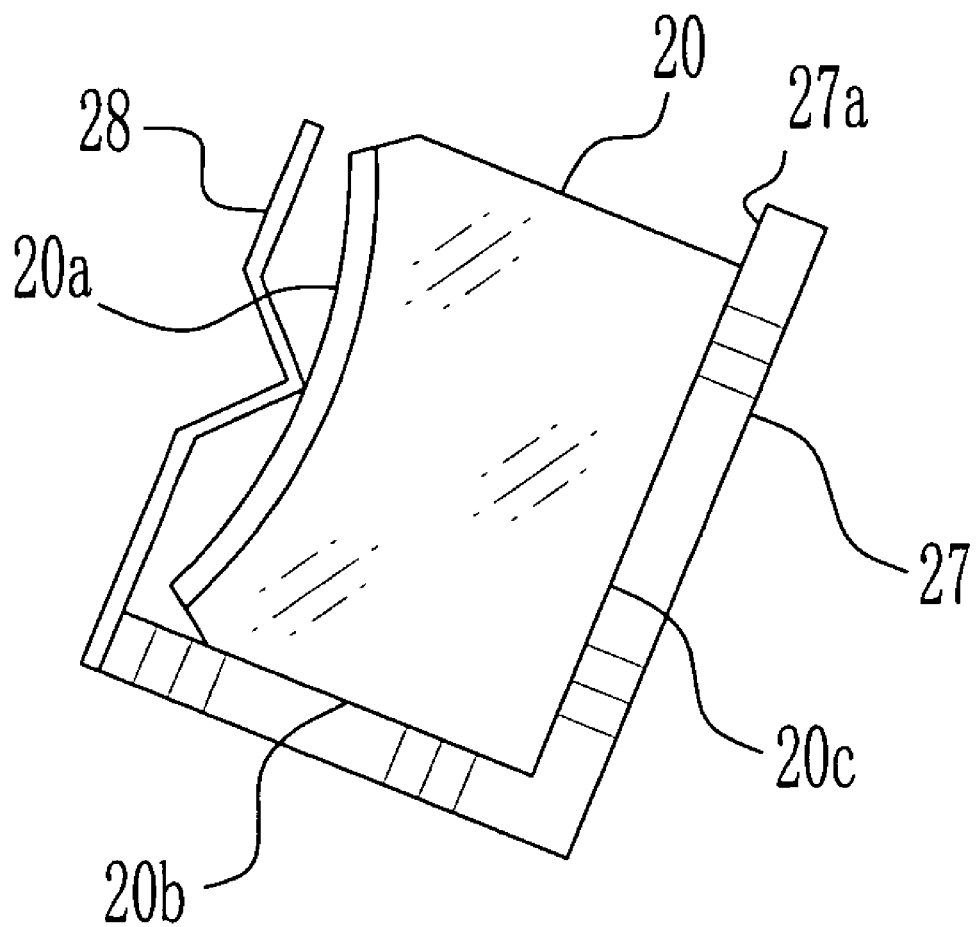
FIG. 3 is a side view of a cylindrical mirror.

As shown in FIG. 3, the cylindrical mirror 20 is held by a mirror retainer 27 having an L-shaped cross-sectional surface. A bottom surface 20b and a rear surface 20c of the cylindrical mirror 20 are pressed to contact an inner surface 27a of the mirror retainer 27 by a leaf spring 28 provided in both ends in the main scanning correspondence direction CM of the mirror retainer 27. Thereby, the cylindrical mirror 20 is surely fixed to the mirror retainer 27.

The flat mirror 21 shown in FIG. 1 reflects the light beam from the cylindrical mirror 20 on a reflective surface 21a to irradiate the light beam onto the recording paper 7. The recording paper 7 is advanced along the sub-scanning direction S by a feeding device (not shown). The image is recorded on the recording paper 7 by scanning and exposing the light beam in the main scanning direction M as the recording paper 7 is advanced.

Figure 4A:
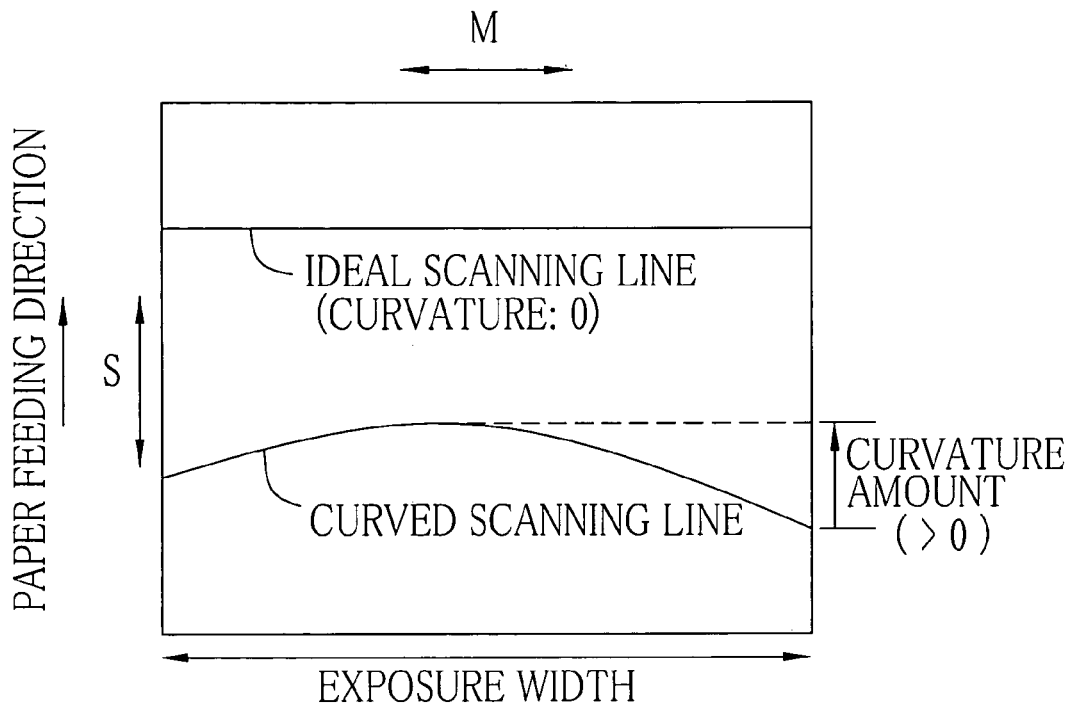
FIGS. 4A and 4B are explanatory views of a curvature amount of a scanning line.
Figure 4B:
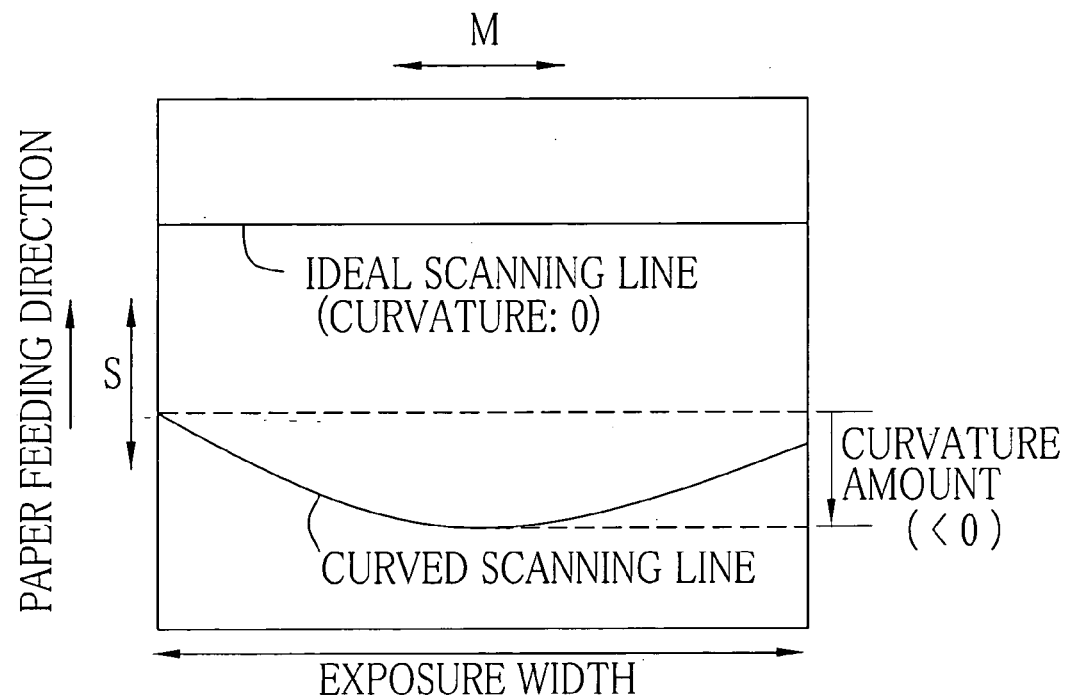

The inclination angles α1 and α2 to the main scanning plane of the first and second fθ lenses 17 and 18 are explained. The inclination angles α1 and α2 are determined so as to satisfy the after-mentioned first, second, and third conditions. A "curvature amount" of the scanning line represents projection length when the scanning line to be drawn is projected in the sub-scanning direction S as shown in FIG. 4, and the curvature amount is defined as positive if the curvature of the scanning line is convex to the positive direction of the sub-scanning direction S (see FIG. 4A), while it is defined as negative if the curvature is concave to the positive direction of the sub-scanning direction S (see FIG. 4B). When calculating the curvature amount, although the length of the scanning line to be test-recorded may be arbitral, the scanning line is recorded on the well-known size of the recording paper (e.g. L-size, 2L-size, and KG-size). Preferably, the maximum size of the recording paper capable of being recorded by the light scanning device 2 is used.

First, the generalized first condition is shown. The fθ lenses are numbered as i=1, 2, . . . from the fθ lens closest to the polygon mirror 5, and the inclination angle of the i-th fθ lens is determined to αi. When only the i-th fθ lens is inclined at αi, the curvature amount in the sub-scanning direction S of the scanning line 8 to be drawn on the recording paper 7 is represented as δi. If αi is small, δi is changed approximately linearly to αi, and can be approximated as the following equation: δi=Kiαi. The change rate Ki is a constant. Ki can be calculated by measuring the curvature amount (Δi) in the case where the i-th fθ lens has the predetermined inclination angle (Ai). Ki satisfies the following equation: Ki=Δi/Ai. With respect to αi, a clockwise direction is assumed positive, while a counter clockwise direction is assumed negative in FIG. 2.

In the first condition, the rotating direction around the central axis extending in the main scanning correspondence direction CM of each fθ lens and the ratio of absolute value of each inclination angle are determined so that absolute value of the summation of the curvature amount of all fθ lenses "|Σδi|" becomes the minimum.

When the first condition is applied to the present embodiment, the rotating direction around the central axes 24, 25 of the first and second fθ lenses 17, 18 and the ratio of the absolute value of α1, α2 "|α1|:|α2|" may be determined so that absolute value of the summation of the curvature amount "|Σδi|=|δ1+δ2|=|K1α1+K2α2|" becomes the minimum.

Figure 5A:
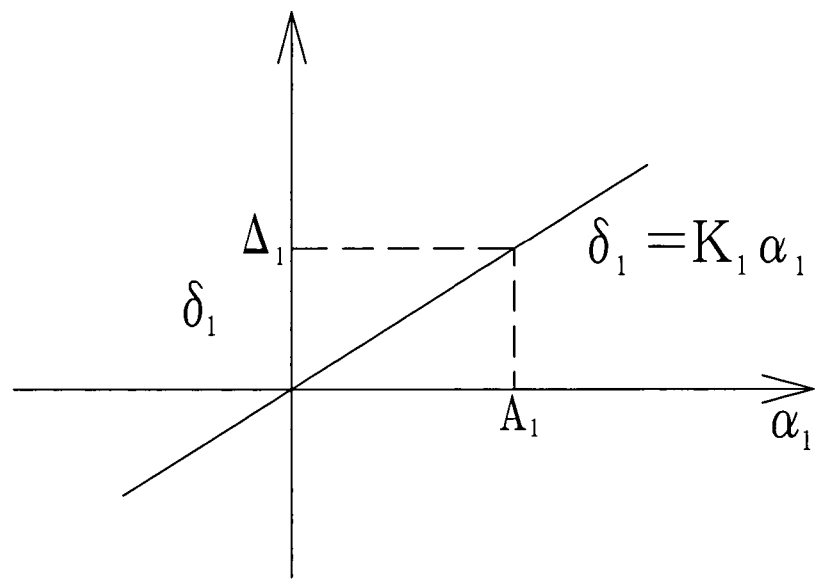
FIGS. 5A and 5B are graphs showing relation between an inclination angle and the curvature amount of the scanning line.
Figure 5B:
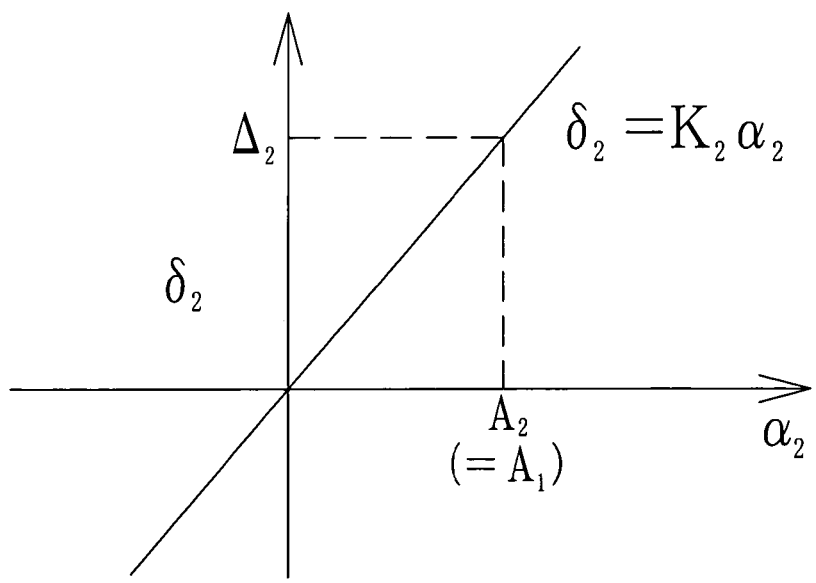

As shown in FIG. 5A, K1 is calculated by measuring the curvature amount Δ1 in the case where the first fθ lens 17 is inclined at the predetermined inclination angle A1. As shown in FIG. 5B, a change rate K2 is calculated by measuring the curvature amount Δ2 in the case where the second fθ lens 18 is inclined at the predetermined inclination angle A2 (=A1). The rotating directions of the fθ lenses 17 and 18 are respectively reversed when the following condition is satisfied: K1·K2>0, while the rotating directions are oriented in the same direction when the following condition is satisfied: K1·K2<0. Thereby, the positive and negative signs of the curvature amounts δ1 and δ2 are reversed.

The ratio of the absolute value of the inclination angles α1 and α2 is an inverse ratio of the absolute value of the curvature amount Δ1 and Δ2, and represented by the following condition: |α1|:|α2|=1/Δ1|:|1/Δ2|. Instead of the inverse ratio of the absolute value of Δ1 and Δ2, an inverse ratio of the absolute value of the change rates K1 and K2 "|α1|:|α2|=1/K1|:|1/K2|" may be used. Thereby, each absolute value of δ1 and δ2 becomes similar.

As above-mentioned, the positive and negative signs of the curvature amounts δ1, δ2 are respectively reversed by disposing each fθ lens 17, 18 in accordance with the inclination angles α1, α2 determined based on the first condition, so that the amount of δ1, δ2 becomes about the same. Thereby, δ1 and δ2 offset each other, so that it is considered that the sum of the curvature amount becomes approximately zero. Each of the fθ lenses 17, 18 is preferably arranged correctly; however, since arrangement error occurs when arranging these lenses in fact, an allowable error in the sum of the curvature amount is determined, so that each fθ lens 17, 18 may be arranged by the inclination angle satisfying the condition: |K1α1+K2α2|≦0.2 mm. In the exposure wherein an image resolution is 300 dpi–400 dpi, the width of the scanning line is about 0.05–0.1 mm. Therefore, in order to prevent interruption of the scanning line 8 to be drawn on the end portion in the sub-scanning direction S of the recording paper 7, the inclination angle preferably satisfies the condition: |K1α1+K2α2|≦0.1 mm, more preferably, |K1α1+K2α2|≦0.05 mm.

In the above embodiment, the scanning lens is constituted of two lens units: first and second fθ lenses 17, 18; however, even if the scanning lens is constituted of three or more lens units, the rotating direction of each lens unit and the ratio of the absolute value of the inclination angle of each lens unit are calculated to satisfy the first condition. Hereinafter, the scanning lens is constituted of three lens units. In this case, as a matter of convenience, specific numeric values are used.

The scanning lens is constituted of a first fθ lens, a second fθ lens, and a third fθ lens. The curvature amounts are measured by inclining each of these fθ lenses, one at a time, at the predetermined angle. The curvature amounts are assumed to be measured as follows: when A1=+1°, Δ1=+1 μm; when A2=+1°, Δ2=+2 μm; and when A3=+1°, Δ3=+3 μm.

In this case, the rotating directions of the first and second fθ lenses are reversed to the rotating direction of the third fθ lens, and the ratio of the absolute value of the inclination angle of each fθ lens is determined as follows: |α1|:|α2|:|α3|=1:1:1. Thereby, the curvature amounts δ1, δ2, and δ3 are +1 μm, +2 μm, and −3 μm respectively, so that the summation of the curvature amount becomes zero.

Instead of the above combination, the rotating directions of the first and third fθ lenses are reversed to the rotating direction of the second fθ lens, and the ratio of the absolute value of the inclination angle of each fθ lens is determined to satisfy the following equation: |α1|:|α2|:|α3|=1:2:1. Thereby, δ1, δ2, and δ3 are +1 μm, −4 μm, and +3 μm, so that the summation of the curvature amount is zero. Since there are plural combinations in the rotating direction of each fθ lens and the ratio of the absolute value of each inclination angle, the appropriate pattern can be selected. The allowable error in the sum of the curvature amount is determined, so that each fθ lens may be arranged in accordance with the inclination angle satisfying the following condition: $|\Sigma \delta i| \leq 0.2$ mm, particularly $|\Sigma \delta i| \leq 0.1$ mm, especially $|\delta i| \leq 0.05$ mm.

Next, the second condition is explained. The second condition which the inclination angle α1 should fulfill is expressed by the following mathematical expression (9) (see FIG. 7). The inclination angle α1 is determined within the mathematical expression (9):

$$\begin{cases} \left| -r_0 + \frac{t_0}{2}\cos 2\alpha_1 - \xi_0 \sin 2\alpha_1 + 2\xi_1 \sin \alpha_1 \right| > \\ \omega_0 \sqrt{1 + \left(\frac{4\lambda Q_\alpha}{\pi \omega_0^2}\right)^2} \\ \text{However,} \\ -\left(\frac{t_0}{2} - \omega_0\right) \leq r_0 \leq \frac{t_0}{2} - \omega_0 \\ Q_\alpha = \xi_0 - \frac{\xi_1}{\cos \alpha_1} + r_0 \tan \alpha_1 + \\ \frac{1}{2}\left|2\cos 2\alpha_1\left(\xi_0 - \frac{\xi_1}{\cos \alpha_1}\right) + t_0 \sin 2\alpha_1 - 2r_0 \tan \alpha_1\right| \end{cases}$$

where λ is a wave length of the longest light beam; ω0 is a beam waist diameter of a light beam L1 having wave length λ near the reflective surface 5a of the polygon mirror 5; ξ0 is distance from a reflection point R0 of the light beam L1 on the reflective surface 5a to a flat surface perpendicular to the main scanning plane, and the flat surface includes the center axis 24 of the first fθ lens 17; ξ1 is distance from the center axis 24 to the light entering surface 17a of the first fθ lens 17; r0 is distance from a flat surface parallel to the main scanning plane to the reflection point R0, and the flat surface includes the center axis 24; and t0 is width in the sub-scanning correspondence direction CS of the reflective surface 5a.

Figure 6:
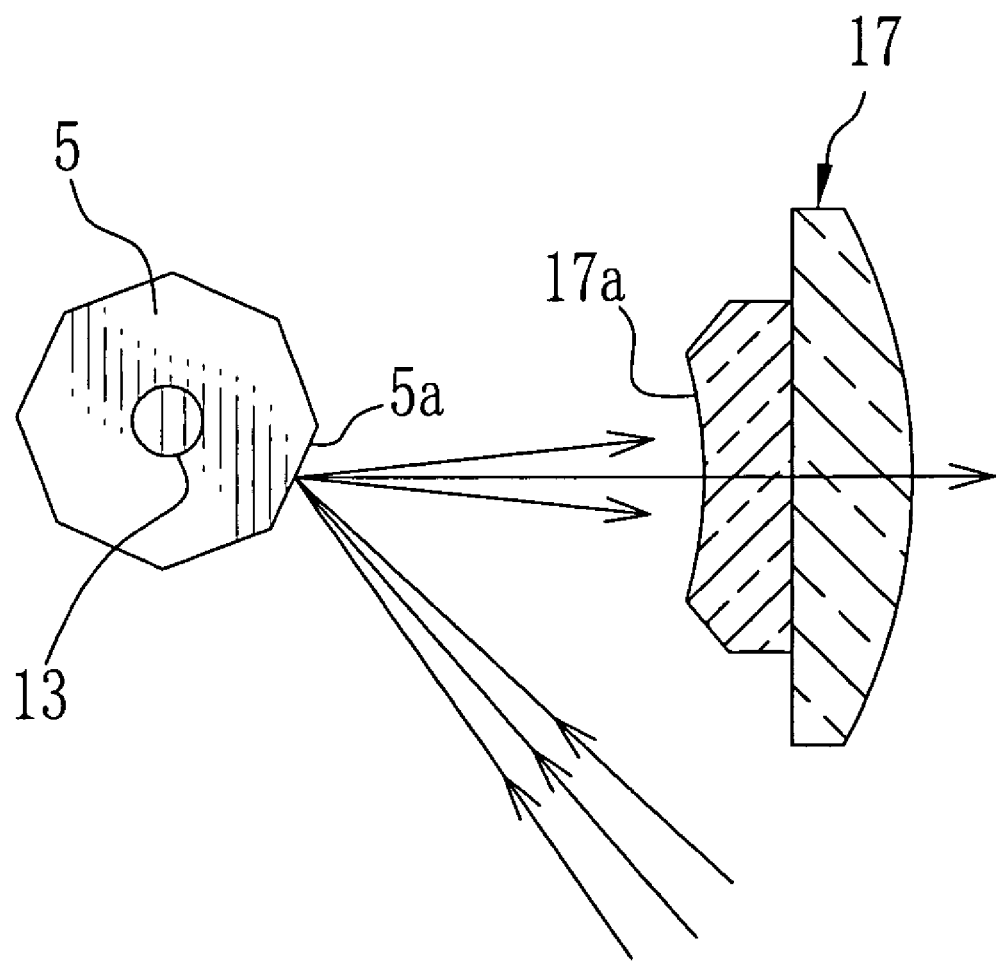
FIG. 6 is a plan view of a polygon mirror and a first fθ lens.

Next, a derivation process of the mathematical expression (9) is shown. Here, the light beam entered the polygon mirror 5 is reflected in parallel with the center axis of the first fθ lens 17. When the plural light beams enter the polygon mirror 5 without combining, out of the light beam, which satisfies a condition that the incident angle to the polygon mirror 5 is closet to the average value of the incident angles of all light beams, is assumed to be reflected in parallel with the axis of the first fθ lens 17. Especially, as shown in FIG. 6, when the odd numbers of light beams are separated with one another at a constant interval in angle to enter the polygon mirror 5, the middle light beam is assumed to be reflected in parallel with the axis of the first fθ lens 17. Meanwhile, the even numbers of the light beams are separated at a constant interval in angle to enter the polygon mirror 5, a hypothetical light beam in the middle between two light beams, which is closet to the average value of the incident angles of all light beams, is assumed to be reflected in parallel with the axis of the first fθ lens 17. Hereinafter, when the light beams specified as above, namely plural light beams enter the polygon mirror 5, the reference light beam is referred to as a reference-light beam.

Figure 7:
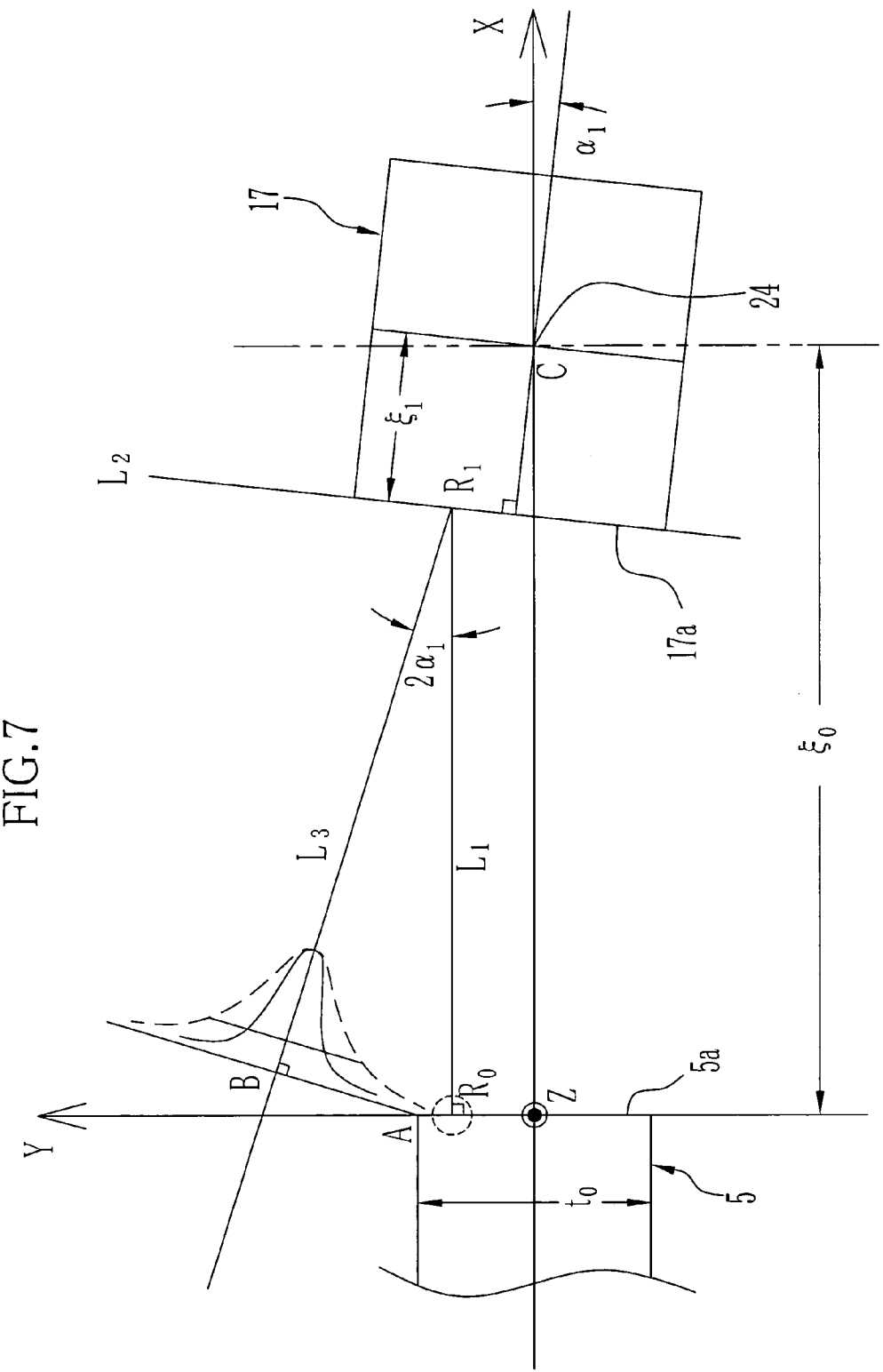
FIG. 7 is a cross-sectional side view of the polygon mirror and the first fθ lens.

The light beam reflected in parallel with the axis of the first fθ lens 17 is represented as L1. When the plural light beams are entered the polygon mirror 5 without combining, the reference-light beam corresponds to the light beam L1. FIG. 7 shows the deflection of the light beam L1 on the reflective surface 5a and the state that the first entering light beam L1 is entered/reflected to the first fθ lens 17. A zx flat surface is a scanned surface by the light beam L1. A z direction is the main scanning correspondence direction CM, and a y direction is the sub-scanning correspondence direction CS.

The reflection point R0 of the light beam L1 on the reflective surface 5a is represented by the following equation (10):

$$R_0 = \begin{pmatrix} 0 \\ r_0 \end{pmatrix}.$$

Figure 8:
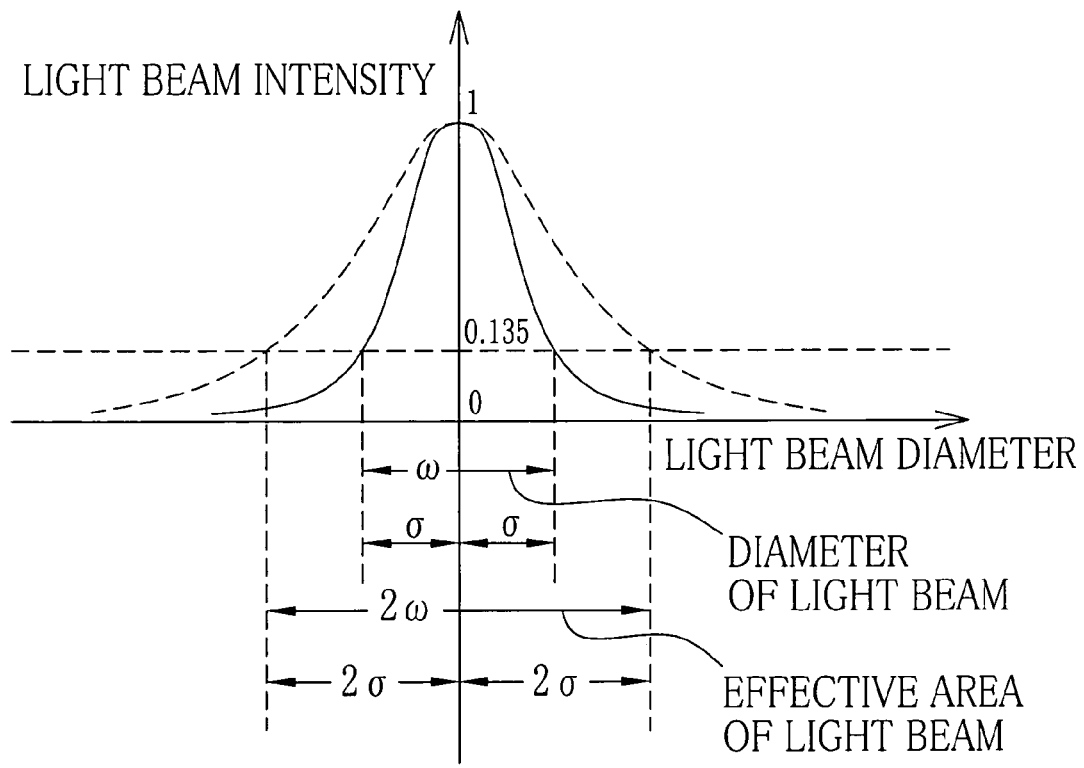
FIG. 8 is a graph showing intensity distribution of a light beam.

The width in the sub-scanning correspondence direction CS of the reflective surface 5a is t0. A beam waist diameter of the light beam L1 (13.5% intensity diameter) near the reflection point R0 is ω0. As shown in FIG. 8, the effective area of the Gaussian beam entering the polygon mirror 5 is assumed to be no more than twice as large as the diameter of the Gaussian beam (area of 13.5% intensity to the peak intensity). The condition of the position of the reflection point is determined so that the effective area does not deviate from a reflecting area of the reflective surface 5a. Thereby, the condition of r0 satisfies the following condition (11):

$$-\left(\frac{t_0}{2} - \omega_0\right) \leq r_0 \leq \frac{t_0}{2} - \omega_0$$

The light beam L1 reflected on the reflective surface 5a passes through the reflection point R0. The reflected light beam L1 is a straight line in parallel with x-axis to satisfy the following equation (12):

y=r0

The inclination angle of the first fθ lens 17 is represented as α1. The distance from the reflection point R0 to the flat surface perpendicular to the main scanning plane is represented as ξ0. The flat surface includes the center axis 24 of the first fθ lens 17. The distance from the center axis 24 to the entering surface 22a of the first fθ lens 17 is represented as ξ1. The wavelength of the light beam from the light source (the longest wavelength in a multi laser optical system) is represented as λ.

A straight line L2 representing the light entering surface 17a of the first fθ lens 17 satisfies the following equation (13):

$$y = \frac{1}{\tan \alpha_1}\left\{x - \left(\xi_0 - \frac{\xi_1}{\cos \alpha_1}\right)\right\}$$

A point at the intersection of the straight lines L1 and L2, namely a point satisfying the equations (12) and (13) represents the reflection point R1 of the light beam L1 on the light entering surface 17a of the first fθ lens 17. The reflection point R1 satisfies the following equation (14):

$$R_1 = \begin{pmatrix} \xi_0 - \dfrac{\xi_1}{\cos\alpha_1} + r_0\tan\alpha_1 \\ r_0 \end{pmatrix}$$

A straight line L3 satisfies the following equation (15):

$$\tan 2\alpha_1 \cdot x + y + \left\{ -r_0 - \tan 2\alpha_1 \left( \xi_0 - \dfrac{\xi_1}{\cos\alpha_1} + r_0\tan\alpha_1 \right) \right\} = 0$$

The distance between the straight line L3 and a point A, which is an end surface of the reflection point 5a (the length of line segment AB) is obtained by the following equation (16):

$$\overline{AB} = \left| -r_0 + \dfrac{t_0}{2}\cos 2\alpha_1 - \xi_0\sin 2\alpha_1 + 2\xi_1\sin\alpha_1 \right|$$

With respect to a beam profile at a point B, when a beam radius of 13.5% intensity is assumed to be σ, the effective area will be 2σ, so that it is necessary that the length of the line segment AB is larger than 2σ in order to prevent the occurrence of the ghost light.

Transmission distance of the main light beam from the point R0 to the point B is calculated to obtain the beam radius σ at the point B. The distance from the point R0 to the point R1 satisfies the following equation (17) based on the equation (14):

$$\overline{R_0 R_1} = \xi_0 - \dfrac{\xi_1}{\cos\alpha_1} + r_0\tan\alpha_1$$

The line segment AB satisfies the following equation (18):

$$x - \tan 2\alpha_1 y + \dfrac{\tan 2\alpha_1}{2} t_0 = 0$$

The distance from the point R1 to the point B satisfies the following equation (19):

$$\overline{R_1 B} = \dfrac{1}{2}\left| 2\cos 2\alpha_1 \left( \xi_0 - \dfrac{\xi_1}{\cos\alpha_1} \right) + t_0\sin 2\alpha_1 - 2r_0\tan\alpha_1 \right|$$

When the transmission distance of the main light beam from the point R0 to the point B is represented as Qα, Qα satisfies the following equation (20):

$$Q_\alpha = \overline{R_0 R_1} + \overline{R_1 B} =$$
$$\xi_0 - \dfrac{\xi_1}{\cos\alpha_1} + r_0\tan\alpha_1 + \dfrac{1}{2}\left| 2\cos 2\alpha_1 \left( \xi_0 - \dfrac{\xi_1}{\cos\alpha_1} \right) + t_0\sin 2\alpha_1 - 2r_0\tan\alpha_1 \right|.$$

When the formula showing the relation between the beam waist diameter of the Gaussian beam and the transmission is used, the beam radius σ (13.5% intensity) at the point B satisfies the following equation (21):

$$\sigma = \dfrac{\omega_0}{2}\sqrt{1 + \left(\dfrac{4\lambda Q_\alpha}{\pi\omega_0^2}\right)^2}$$

The condition that reflective surface 5a of the polygon mirror 5 is not included within the beam effective area at the point B of the light beam L3, namely the condition that the line segment AB is larger than twice the beam radius σ at the point B is represented by the mathematical expression (9) based on the expressions (11), (16), (20), and (21).

Figure 9:
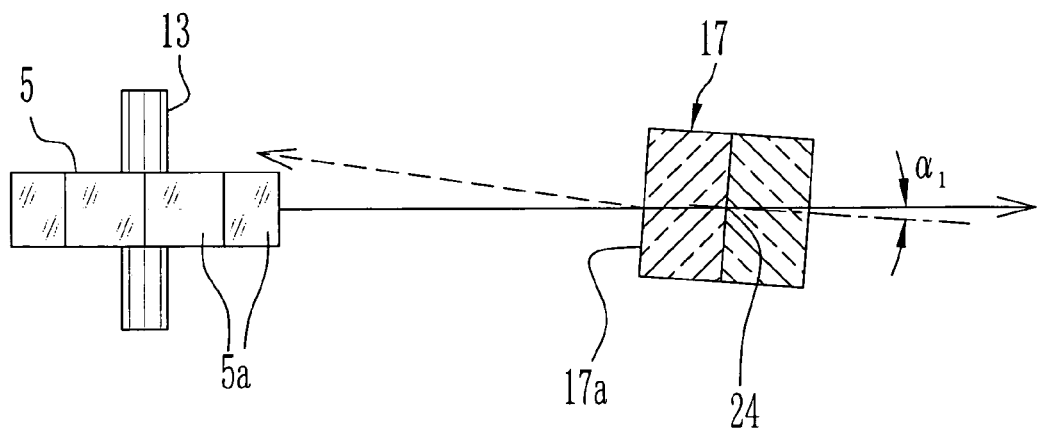
FIG. 9 is a view for explaining the state where multiple reflections between the polygon mirror and the first fθ lens are transmitted to an ineffective area.

If the inclination angle α1 is set within the range satisfying the mathematical expression (9), each light beam reflected on the light entering surface 17a of the first fθ lens 17 advances to the ineffective area where each light beam does not reach the recording paper 7 without entering the reflective surface 5a of the polygon mirror 5 as shown in FIG. 9.

In the second condition, the following mathematical expression (22) (see FIG. 10) may be used instead of the mathematical expression (9). In this case, the inclination angle α1 is determined so as to satisfy the mathematical expression (22) as follows:

$$\begin{cases} Q_\beta > \omega_0 \sqrt{1 + \left(\dfrac{4\lambda \tilde{R_0}T}{\pi\omega_0^2}\right)^2} \\ \text{However,} \\ -\left(\dfrac{t_1}{2} - \omega_0\right) \leq r_0 \leq \dfrac{t_1}{2} - \omega_0 \\ Q_\beta = \left| r_0 - \dfrac{1}{2}t_2\cos 3\alpha_1 + 2\xi_0\sin 2\alpha_1 - (2\sin\alpha_1 + \sin 3\alpha_1)\xi_1 \right| \\ \tilde{R_0}T = Q_\gamma + Q_\delta \\ Q_\gamma = \left(1 + \dfrac{1}{\cos 2\alpha_1}\right)\left(\xi_0 - \dfrac{\xi_1}{\cos\alpha_1} + r_0\tan\alpha_1\right) \\ Q_\delta = |\cos 2\alpha_1||\tan 2\alpha_1|\left\{\dfrac{1}{\cos 2\alpha_1}(r_0 + \xi_0\sin 2\alpha_1 - 2\xi_1\sin\alpha_1)\right\} + \\ \left\{\left(-(\xi_0 - \xi_1\cos\alpha_1 + \dfrac{t_2}{2}\sin\alpha_1\right) - \tan 2\alpha_1\left(\xi_1\sin\alpha_1 + \dfrac{t_2}{2}\cos\alpha_1\right)\right\} \end{cases}$$

where λ is the wave length of the longest light beam; ω0 is the beam waist diameter of the light beam L1 having wave length λ near the reflective surface 5a of the polygon mirror 5; ξ0 is distance from the reflection point R0 of the light beam L1 on the reflective surface 5a to the flat surface perpendicular to the main scanning plane, and the flat surface includes the center axis 24 of the first fθ lens 17; ξ1 is distance from the center axis 24 to the light entering surface 17a of the first fθ lens 17; r0 is distance from the flat surface parallel to the main scanning plane to the reflection point R0, and the flat surface includes the center axis 24; t1 is width in the sub-scanning correspondence direction CS of the reflective surface 5a; and t2 is width of the light entering surface 17a in the sub-scanning correspondence direction CS.

Hereinafter, a derivation process of the mathematical expression (22) is shown with reference to FIG. 10. When the light beam reflected on the polygon mirror 5 is L1, and the light beam which is a component reflected on the light entering surface 17a (straight line L2) is L3, a light beam L4 which is a component reflected again at a point S of the reflective surface 5a is considered. A closest distance between the straight line L4 and the first fθ lens 17 corresponds to the length of line segment TU in FIG. 10. When the line segment TU is larger than the effective area (assumed to be twice the beam diameter area of 13.5% intensity), the light beam L4 does not enter the first fθ lens 17 again. The mathematical expression (22) is obtained by a similar procedure to the mathematical expression (9).

The reflection point R0 on the reflective surface 5a of the polygon mirror 5 is represented by the following equation (23):

$$R_0 = \begin{pmatrix} 0 \\ r_0 \end{pmatrix}$$

The light beam L1 is a straight line parallel to the x-axis and satisfies the following equation (24):

$$y = r_0$$

The effective area of the Gaussian beam entering the polygon mirror 5 is assumed to be twice as large as the diameter of the Gaussian beam (area of 13.5% intensity to the peak intensity). The condition of the position of the reflection point is determined so that the effective area does not deviate from a reflecting area of the reflective surface 5a. Thereby, the condition of r0 satisfies the following condition (25):

$$-\left(\frac{t_1}{2} - \omega_0\right) \leq r_0 \leq \frac{t_1}{2} - \omega_0$$

The width in the sub-scanning correspondence direction CS of the reflective surface 5a of the polygon mirror 5 is represented as t1. The width in the sub-scanning correspondence direction CS of the light entering surface 17a of the first fθ lens 17 is represented as t2. ξ0, ξ1, and λ are similar to the case where the formula 9 is derived.

The straight line L2 satisfies the following equation (26):

$$y = \frac{1}{\tan\alpha_1}\left\{x - \left(\xi_0 - \frac{\xi_1}{\cos\alpha_1}\right)\right\}$$

The point at the intersection of the straight lines L1 and L2, namely a point satisfying the equations (24) and (26) represents the reflection point R1 on the light entering surface 17a of the first fθ lens 17 (straight line L2). The reflection point R1 satisfies the following equation (27):

$$R_1 = \begin{pmatrix} \xi_0 - \frac{\xi_1}{\cos\alpha_1} + r_0\tan\alpha_1 \\ r_0 \end{pmatrix}$$

The straight line L3 satisfies the following equation (28):

$$\tan 2\alpha_1 \cdot x + y + \left\{-r_0 - \tan 2\alpha_1\left(\xi_0 - \frac{\xi_1}{\cos\alpha_1} + r_0\tan\alpha_1\right)\right\} = 0$$

The coordinate of a re-entering point S of the light beam L3 which is a re-entering light to the polygon mirror 5 satisfies the following equation (29) based on the y-coordinate in the equation (28):

$$S = \begin{pmatrix} 0 \\ \frac{1}{\cos 2\alpha_1}(r_0 + \xi_0\sin 2\alpha_1 - 2\xi_1\sin\alpha_1) \end{pmatrix}$$

Figure 10:
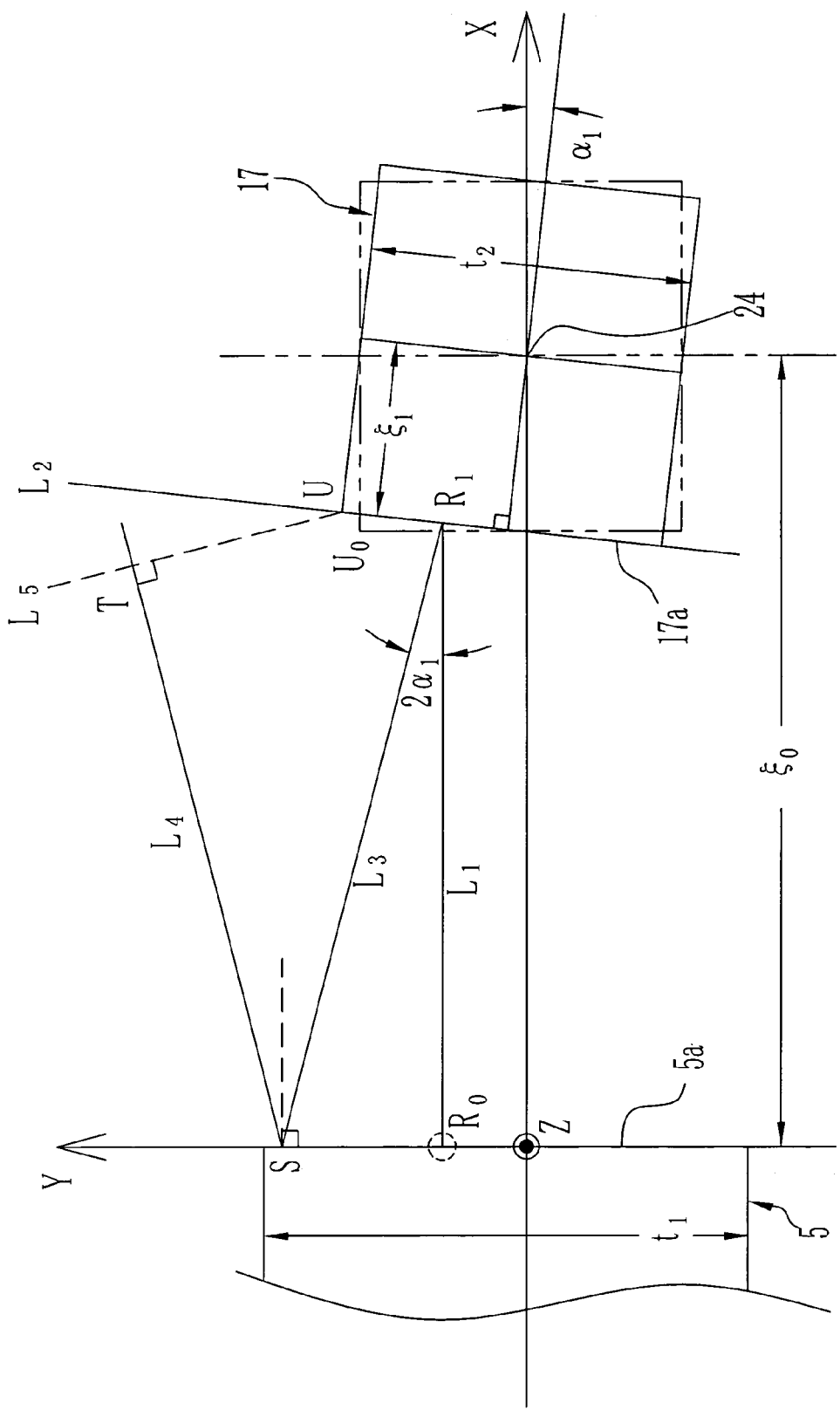
FIG. 10 is cross-sectional side view of the polygon mirror and the first fθ lens.

Here, the coordinate U in FIG. 10 is calculated. The coordinate U0 is assumed to rotate by $-\alpha_1$ around the coordinate C. When the origin of the coordinate is represented as 0, the coordinate U satisfies the following equations (30) and (31):

$$\overrightarrow{OU_0} = \begin{pmatrix} \xi_0 \\ 0 \end{pmatrix} + \begin{pmatrix} -\xi_1 \\ \frac{t_2}{2} \end{pmatrix}, \text{ and}$$

$$\overrightarrow{OU} = \begin{pmatrix} \xi_0 \\ 0 \end{pmatrix} + \begin{pmatrix} \cos(-\alpha_1) & -\sin(-\alpha_1) \\ \sin(-\alpha_1) & \cos(-\alpha_1) \end{pmatrix}\begin{pmatrix} -\xi_1 \\ \frac{t_2}{2} \end{pmatrix}$$

$$= \begin{pmatrix} \xi_0 - \xi_1\cos\alpha_1 + \frac{t_2}{2}\sin\alpha_1 \\ \xi_1\sin\alpha_1 + \frac{t_2}{2}\cos\alpha_1 \end{pmatrix}$$

The straight line 4 satisfies the following equation (32):

$$\tan 2\alpha_1 \cdot x - y + \left\{\frac{1}{\cos 2\alpha_1}(r_0 + \xi_0\sin 2\alpha_1 - 2\xi_1\sin\alpha_1)\right\} = 0$$

The distance between the straight line L3 and the point U is obtained by the equations (31) and (32) (length of the line segment TU), and then these equations are deformed as follows:

$$\overline{TU} = \left|r_0 - \frac{1}{2}t_2\cos 3\alpha_1 + 2\xi_0\sin 2\alpha_1 - (2\sin\alpha_1 + \sin 3\alpha_1)\xi_1\right| \equiv Q_\beta$$

where the calculated value is represented as $Q_\beta$.

The beam transmission distance from the point R0 to the point T satisfies the following equation (34):

$$\overline{R_0T} = \overline{R_0R_0} + \overline{R_1S} + \overline{ST}$$

The first two terms in the equation (34) are shown by the following equation (35) based on the equation (27) and the right triangle R0 R1 S in FIG. 10:

$$\overline{R_0R_1} + \overline{R_1S} = \left(1 + \frac{1}{\cos 2\alpha_1}\right)\left(\xi_0 - \frac{\xi_1}{\cos\alpha_1} + r_0\tan\alpha_1\right) \equiv Q_\gamma$$

where the calculated value is represented as $Q_\gamma$.

The length of the line segment ST corresponds to the distance between the point S and a straight line 5 which is perpendicular to the straight line L4 and passes through the point U. The straight line L4 is the re-reflecting light on the polygon mirror 5. The point U is an end surface of the light entering surface 17a of the first fθ lens 17. The straight line L5 satisfies the following equation (36):

$$x + \tan 2\alpha_1 \cdot y +$$
$$\left\{-\left(\xi_0 - \xi_1\cos\alpha_1 + \frac{t_2}{2}\sin\alpha_1\right) - \tan 2\alpha_1\left(\xi_1\sin\alpha_1 + \frac{t_2}{2}\cos\alpha_1\right)\right\} = 0$$

The length of the line segment ST satisfies the following equation (37):

$$\overline{ST} = |\cos 2\alpha_1| \left| \tan 2\alpha_1 \left\{ \frac{1}{\cos 2\alpha_1}(r_0 + \xi_0\sin 2\alpha_1 - 2\xi_1\sin\alpha_1) \right\} + \right.$$
$$\left. \left\{ -\left(\xi_0 - \xi_1\cos\alpha_1 + \frac{t_2}{2}\sin\alpha_1\right) - \tan 2\alpha_1\left(\xi_1\sin\alpha_1 + \frac{t_2}{2}\cos\alpha_1\right) \right\} \right| \equiv Q_\delta$$

where the calculated value is represented as $Q_o$.

Beam transmission distance R0-T from the point R0 to the point T satisfies the following equation (38) based on the equations (34), (35), and (37):

$$\tilde{R_0}\tilde{T} = Q_y = Q_\delta$$

When the formula showing the relation between the beam waist diameter of the Gaussian beam and the transmission is used, the beam radius σ (13.5% intensity) at the point T satisfies the following mathematical expression (39):

$$\begin{cases} \sigma = \frac{\omega_0}{2}\sqrt{1 + \left(\frac{4\lambda \tilde{R_0}T}{\pi\omega_0^2}\right)^2} \\ \text{However,} \\ \tilde{R_0}T = Q_y + Q_\delta \end{cases}$$

As above-mentioned, the condition that light entering surface 17a of the first fθ lens 17 is not included within the beam effective area at the point T of the light beam L4, namely the condition that the line segment TU is larger than twice the beam radius σ at the point T is represented by the mathematical expression (22) based on the expressions (25), (33), (35), (37), and (39).

Figure 11:
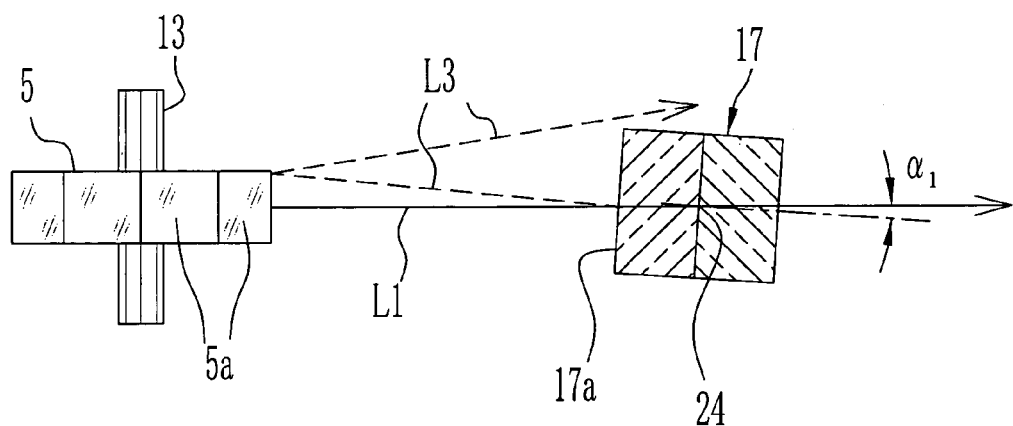
FIG. 11 is a view for explaining the state where multiple reflections between the polygon mirror and the first fθ lens are transmitted to the ineffective area.

If the inclination angle α1 is set within the range satisfying the mathematical expression (22), each light beam reflected on the light entering surface 17a of the first fθ lens 17 advances to the ineffective area without entering the light entering surface 17a again after re-reflecting on the reflective surface 5a of the polygon mirror 5 as shown in FIG. 11.

The inclination angle α1 is determined within the range satisfying the second condition as above, so that it is possible to prevent the ghost caused by the multiple reflections occurring between the polygon mirror 5 and the first fθ lens 17.

In the third condition, the ranges of the inclination angles α1 and α2 are determined such that the effective area of the multi-reflecting light beam between the first fθ lens 17 and the second fθ lens 18 (twice the beam diameter area of 13.5% intensity) does not enter the reflective surface 20a of the cylindrical mirror 20 or the reflective surface 21a of the flat mirror 21.

Figure 12:
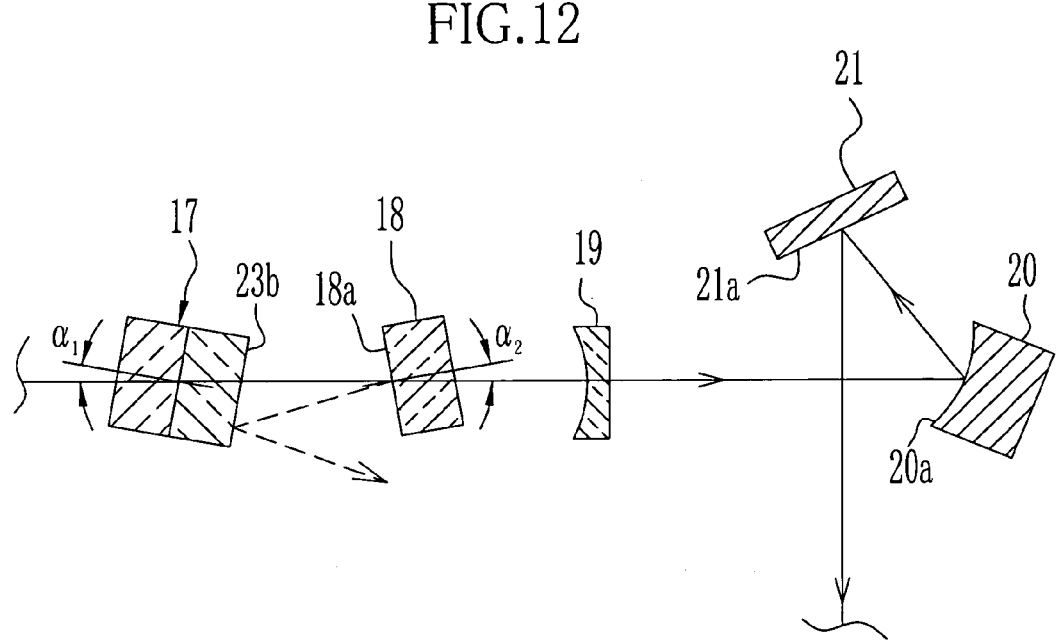
FIG. 12 is a view for explaining the state where multiple reflections between the first fθ lens and a second fθ lens are transmitted to the ineffective area.
Figure 13:
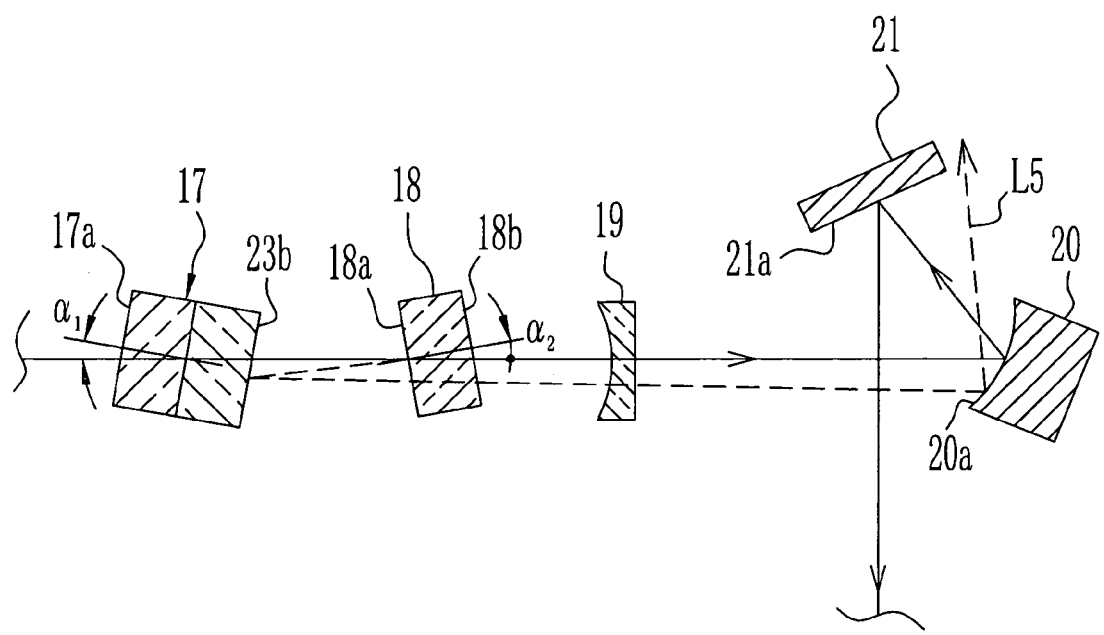
FIG. 13 is a view for explaining the state where multiple reflections between the first fθ lens and the second fθ lens are transmitted to the ineffective area.

When the inclination angles α1 and α2 satisfy the third condition, the effective area of the multi-reflecting light beam between the first fθ lens 17 and the second fθ lens 18 advances to the ineffective area without entering the reflective surface 20a of the cylindrical mirror 20 as shown in FIG. 12 or the reflective surface 21a of the flat mirror 21 as shown in FIG. 13. Thereby, it is possible to prevent the ghost occurring due to the multi-reflecting light beam between the first fθ lens 17 and the second fθ lens 18.

The inclination angles α1 and α2 are determined so as to satisfy the first, second, and third conditions, so that it is possible to prevent the ghost occurring due to the multi-reflecting light between the polygon mirror 5 and the first fθ lens 17 and between the first fθ lens 17 and the second fθ lens 18. In addition, the curvature amount of the scanning line 8 can be kept to the minimum. Moreover, new optical element is not required by determining the inclination angles α1 and α2.

In the above embodiment, the inclination angles α1 and α2 are determined so as to satisfy the first, second, and third conditions. However, the inclination angles α1 and α2 may be determined so as to satisfy only the first and second conditions, or only the first and third conditions.

In the above embodiment, although the scanning line 8 is recorded on the recording paper 7 fed in the advancing direction, the scanning line may be recorded on a photoreceptor rotating around a predetermined axis instead of the recording paper 7. Accordingly, the light scanning device 2 can be used in a laser printer and the like in addition to the photo-printer. Moreover, reflecting light from a manuscript is read out by a line sensor or the like after putting the manuscript on a scanned surface, so that the present invention can be applied to an image reader.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A light scanning device for focusing a light beam onto a scanned surface through a scanning lens group after deflecting said light beam emitted from a light source by a rotating deflector, said light scanning device comprising:
   (n) lens units (n is a natural number of ≧2) included in said scanning lens group, said lens units being arranged such that their optical axes are inclined at inclination angles α to a main scanning plane,
   wherein said inclination angles α satisfy the following condition:

$|K1\alpha1 + K2\alpha2 + \ldots + Kn\alpha n| \leq 0.2$ mm where αi is an inclination angle of an i-th lens unit (i is from 1 to n) from said deflector, and a change rate Ki when only said i-th lens unit is inclined at a minute angle Ai is defined as $Ki = \Delta i / Ai$ where a curvature amount on said scanned surface is represented as Δi.

2. A light scanning device as claimed in claim 1, further comprising: at least one optical member for reflecting said beam from said scanning lens group toward said scanned surface;
   wherein said inclination angle Ai is determined such that said beam reflected plural times between said lens units does not enter said optical member.

3. A light scanning device as claimed in claim 2, wherein said inclination angle α1 of a first lens unit being as i=1, satisfies the following mathematical expression:

$$\begin{cases} \left| -r_0 + \frac{t_0}{2}\cos 2\alpha_1 - \xi_0 \sin 2\alpha_1 + 2\xi_1 \sin\alpha_1 \right| > \omega_0 \sqrt{1 + \left(\frac{4\lambda Q_\alpha}{\pi\omega_0^2}\right)^2} \\ \text{However,} \\ -\left(\frac{t_0}{2} - \omega_0\right) \leq r_0 \leq \frac{t_0}{2} - \omega_0 \\ Q_\alpha = \xi_0 - \frac{\xi_1}{\cos\alpha_1} + r_0\tan\alpha_1 + \\ \frac{1}{2}\left|2\cos 2\alpha_1\left(\xi_0 - \frac{\xi_1}{\cos\alpha_1}\right) + t_0 \sin 2\alpha_1 - 2r_0\tan\alpha_1\right| \end{cases}$$

where λ is a wave length of the longest light beam; ω0 is a beam waist diameter of said light beam having wave length λ near a reflective surface of said deflector; ξ0 is distance from a reflection point of said light beam on said reflective surface of said deflector to a flat surface perpendicular to said main scanning plane, and said flat surface includes a center axis of said first lens unit; ξ1 is distance from said center axis of said first lens unit to a light entering surface of said first lens unit; r0 is distance from a flat surface parallel to said main scanning plane to said reflection point of said light beam on said reflective surface of said deflector, and said flat surface includes said center axis of said first lens unit; and t0 is width in a sub-scanning correspondence direction of said reflective surface of said deflector.

4. A light scanning device as claimed in claim 2, wherein said inclination angle α1 of a first lens unit being as i=1, satisfies the following mathematical expression:

$$\begin{cases} Q_\beta > \omega_0 \sqrt{1 + \left(\frac{4\lambda \tilde{R_0}T}{\pi\omega_0^2}\right)^2} \\ \text{However,} \\ -\left(\frac{t_1}{2} - \omega_0\right) \leq r_0 \leq \frac{t_1}{2} - \omega_0 \\ Q_\beta = \left|r_0 - \frac{1}{2}t_2\cos 3\alpha_1 + 2\xi_0 \sin 2\alpha_1 - (2\sin\alpha_1 + \sin 3\alpha_1)\xi_1\right| \\ \tilde{R_0}T = Q_\gamma + Q_\delta \\ Q_\gamma = \left(1 + \frac{1}{\cos 2\alpha_1}\right)\left(\xi_0 - \frac{\xi_1}{\cos\alpha_1} + r_0\tan\alpha_1\right) \\ Q_\delta = |\cos 2\alpha_1|\left|\tan 2\alpha_1\left\{\frac{1}{\cos 2\alpha_1}(r_0 + \xi_0\sin 2\alpha_1 - 2\xi_1\sin\alpha_1)\right\} + \right. \\ \left. \left\{-\left(\xi_0 - \xi_1\cos\alpha_1 + \frac{t_2}{2}\sin\alpha_1\right) - \tan 2\alpha_1\left(\xi_1\sin\alpha_1 + \frac{t_2}{2}\cos\alpha_1\right)\right\}\right| \end{cases}$$

where λ is a wave length of the longest light beam; ω0 is a beam waist diameter of said light beam having wave length λ near a reflective surface of said deflector; ξ0 is distance from a reflection point of said light beam on said reflective surface of said deflector to a flat surface perpendicular to said main scanning plane, and said flat surface includes a center axis of said first lens unit; ξ1 is distance from said center axis of said first lens unit to a light entering surface of said first lens unit; r0 is distance from a flat surface parallel to said main scanning plane to said reflection point of said light beam on said reflective surface of said deflector, and said flat surface includes said center axis of said first lens unit; t1 is width in a sub-scanning correspondence direction of said reflective surface of said deflector; and t2 is width in said sub-scanning correspondence direction of said light entering surface of said first lens unit.

5. A light scanning device as claimed in claim 4, wherein said first lens unit is an fθ lens for converging said light beam in said main scanning direction.

6. A light scanning device for focusing a light beam onto a scanned surface through a scanning lens group after deflecting said light beam emitted from a light source by a rotating deflector, said light scanning device comprising:

first and second fθ lenses, disposed one by one from said deflector, being included in said scanning lens group, said first and second fθ lenses being arranged such that their optical axes are respectively inclined at inclination angles α1 and α2 to a main scanning plane, wherein said inclination angles α1 and α2 satisfy the following condition:

|K1 α1+K2 α2|≦0.2 mm where K1 is change rate in the case where only said first fθ lens is inclined at a minute angle A1, and when a curvature amount on said scanned surface is represented as Δ1, said change rate K1 is defined as: K1=Δ1/A1; and K2 is change rate in the case where only said second fθ lens is inclined at a minute angle A2, and when the curvature amount on said scanned surface is represented as Δ2, said change rate K2 is defined as: K2=Δ2/A2.

7. A light scanning device as claimed in claim 6, further comprising: at least one optical member for reflecting said light beam from said scanning lens group toward said scanned surface;

wherein said inclination angles α1 and α2 are determined such that said light beam reflected plural times between said first and second fθ lenses does not enter said optical member.

8. A light scanning device as claimed in claim 7, wherein said inclination angle α1 of said first fθ lens satisfies the following mathematical expression:

$$\begin{cases} \left| -r_0 + \frac{t_0}{2}\cos 2\alpha_1 - \xi_0 \sin 2\alpha_1 + 2\xi_1 \sin\alpha_1 \right| > \omega_0 \sqrt{1 + \left(\frac{4\lambda Q_\alpha}{\pi\omega_0^2}\right)^2} \\ \text{However,} \\ -\left(\frac{t_0}{2} - \omega_0\right) \leq r_0 \leq \frac{t_0}{2} - \omega_0 \\ Q_\alpha = \xi_0 - \frac{\xi_1}{\cos\alpha_1} + r_0\tan\alpha_1 + \\ \frac{1}{2}\left|2\cos 2\alpha_1\left(\xi_0 - \frac{\xi_1}{\cos\alpha_1}\right) + t_0 \sin 2\alpha_1 - 2r_0\tan\alpha_1\right| \end{cases}$$

where λ is a wave length of the longest light beam; ω0 is a beam waist diameter of said light beam having wave length λ near a reflective surface of said deflector; ξ0 is distance from a reflection point of said light beam on said reflective surface of said deflector to a flat surface perpendicular to said main scanning plane, and said flat surface includes a center axis of said first fθ lens; ξ1 is distance from said center axis of said first fθ lens to a light entering surface of said first fθ lens; r0 is distance from a flat surface parallel to said main scanning plane to said reflection point of said light beam on said reflective surface of said deflector, and said flat surface includes said center axis of said first fθ lens; and t0 is width in a sub-scanning correspondence direction of said reflective surface of said deflector.

9. A light scanning device as claimed in claim 7, wherein said inclination angle $\alpha 1$ of said first f$\theta$ lens satisfies the following mathematical expression:

$$\begin{cases} Q_\beta > \omega_0 \sqrt{1 + \left(\dfrac{4\lambda \tilde{R_0} T}{\pi \omega_0^2}\right)^2} \\ \text{However,} \\ -\left(\dfrac{t_1}{2} - \omega_0\right) \leq r_0 \leq \dfrac{t_1}{2} - \omega_0 \\ Q_\beta = \left| r_0 - \dfrac{1}{2} t_2 \cos 3\alpha_1 + 2\xi_0 \sin 2\alpha_1 - (2\sin\alpha_1 + \sin 3\alpha_1)\xi_1 \right| \\ \tilde{R_0} T = Q_\gamma + Q_\delta \\ \begin{cases} Q_\gamma = \left(1 + \dfrac{1}{\cos 2\alpha_1}\right)\left(\xi_0 - \dfrac{\xi_1}{\cos\alpha_1} + r_0 \tan\alpha_1\right) \\ Q_\delta = |\cos 2\alpha_1| \left| \tan 2\alpha_1 \left\{ \dfrac{1}{\cos 2\alpha_1}(r_0 + \xi_0 \sin 2\alpha_1 - 2\xi_1 \sin\alpha_1) \right\} + \right. \\ \left. \left\{ -\left(\xi_0 - \xi_1 \cos\alpha_1 + \dfrac{t_2}{2}\sin\alpha_1\right) - \tan 2\alpha_1 \left(\xi_1 \sin\alpha_1 + \dfrac{t_2}{2}\cos\alpha_1\right) \right\} \right| \end{cases} \end{cases}$$

where $\lambda$ is a wave length of the longest light beam; $\omega 0$ is a beam waist diameter of said light beam having wave length $\lambda$ near a reflective surface of said deflector; $\xi 0$ is distance from a reflection point of said light beam on said reflective surface of said deflector to a flat surface perpendicular to said main scanning plane, and said flat surface includes a center axis of said first f$\theta$ lens; $\xi 1$ is distance from said center axis of said first f$\theta$ lens to a light entering surface of said first f$\theta$ lens; $r 0$ is distance from a flat surface parallel to said main scanning plane to said reflection point of said light beam on said reflective surface of said deflector, and said flat surface includes said center axis of said first f$\theta$ lens; $t 1$ is width in a sub-scanning correspondence direction of said reflective surface of said deflector; and $t 2$ is width in said sub-scanning correspondence direction of said light entering surface of said first f$\theta$ lens.

10. A light scanning device as claimed in claim 9, wherein said light source is constituted of plural light sources.

11. A light scanning device as claimed in claim 10, wherein a scanning object is a photographic sensitive material.

* * * * *